Figure 1:
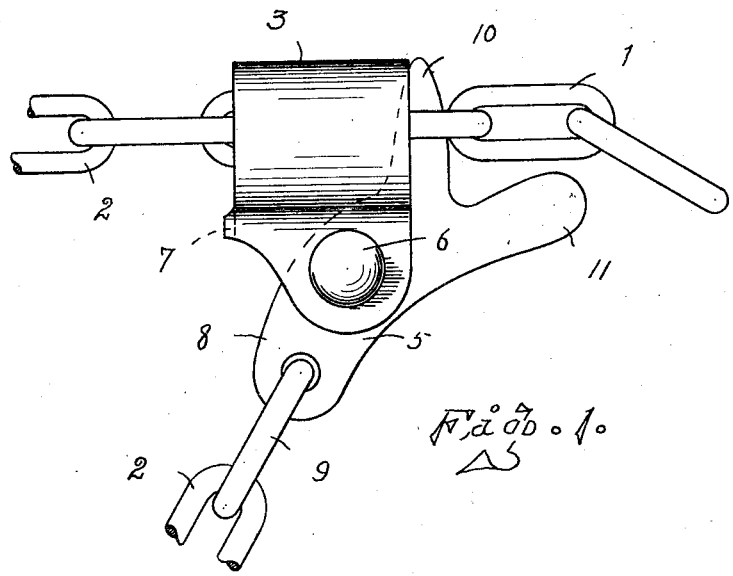

Patented Oct. 15, 1929

1,731,381

UNITED STATES PATENT OFFICE

JOHN KLEFFMAN, OF HIBBING, MINNESOTA

SNARE

Application filed May 7, 1928. Serial No. 275,701.

This invention relates to snares and has special reference to one comprising a novel form of catch and chain; the principal object being to provide a more efficient and dependable device of this character than heretofore known.

Another object is to provide such a snare which may be depended upon to catch and hold the animal alive, that is one not apt to choke the animal to death when caught therein.

Still other objects and advantages of the novel structure will appear in the further description of the invention.

Figure 2:
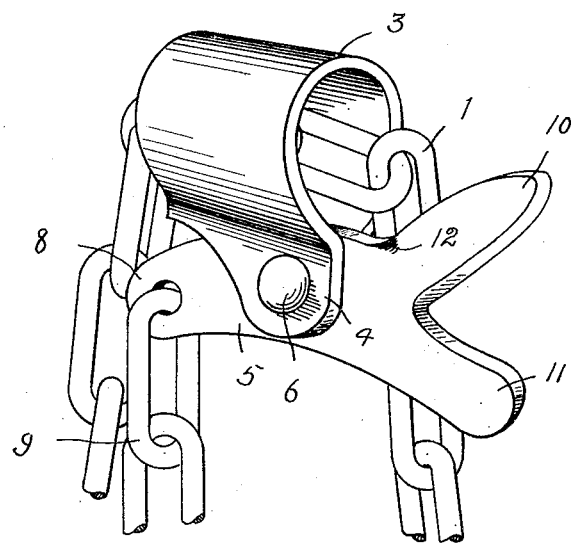

Referring now to the accompanying drawing, forming part of this application, and wherein like reference characters indicate like parts:

Figure 1 is a side elevation of the catch showing it in active locked engagement with the snare chain; and Figure 2 is a perspective view of the catch in inactive position.

1 represents a chain, of which the snare is principally composed, one end of which may be anchored or fastened in any desired manner while that portion indicated at 2 forms the noose of the snare, and 3 is the cylindrical body portion of the catch, which, preferably is slightly longer than one link of the chain, this, however, being immaterial as to the functioning of same.

The body portion 3 of the catch is open with the extremities of the sides being turned downwardly parallel with each other as at 4 and spaced apart sufficiently to receive the dog 5 which is held therebetween by means of any suitable bolt or rivet as indicated at 6. In the making of the body portion of the catch I prefer to bend inwardly rearward extensions 7 of the ears 4 so that their termini meet centrally of the lower portion of the cylindrical body portion 3 thus making the rear end of the body portion a complete circle internally, thereby forming no obstruction to the free paying of the chain therethrough.

The control end 8 of the dog 5 is provided with a suitable hole for the reception of the extreme end link 9 of that portion of the chain forming the noose, and the opposite end of the dog protrudes beyond the front end of the body portion 3 of the catch and is provided with the diagonally disposed prong 10 which is made of a size to conveniently slip into any one of the links of the chain when presented thereto. At an angle to the prong 10 is formed the handle like extension 11 preferably of substantially the same size as the prong 10, this being particularly for convenience in freeing the catch from engagement with the chain when necessary.

The prong 10 is sufficiently long so that when engaged within a link and drawn towards the body portion 3 which occurs when an animal is caught within the snare, the free end of the prong will engage the upper wall of the body portion and not be drawn therethrough; this position being clearly illustrated in Figure 1.

Furthermore the prong 10 is of sufficient size to prevent the chain from being drawn through the body portion 3 when the prong functions as a stop therefor whether a link of same is caught over the prong or to one side thereof, the latter position being shown in Figure 2 of the drawing, though in this instance the dog is not in the attitude of functioning simply because it is shown without a stress being put upon the noose part of the chain. It is however quite evident that whenever such stress occurs the dog will assume locked positon with respect to the movement of the chain through the body of the catch either when a link thereof is over the prong or to one side thereof. It will be noted that at the forward lower corners of the shank of the prong 10 it is slightly reduced in thickness upon either side as at 12 to permit of the free paying of the chain at an angle past the prong when the latter is not in its locked position.

In practice it is found that when the noose is drawn taut about an object and slack results in the stress upon the chain the prong 10 will invariably become hooked within the link next adjacent thereto and assume the position shown in Figure 1 of the drawing, which positively locks the noose against slacking. It is readily seen that the tightness with which the noose may thus become locked will depend upon the length of the links of the chain, that is, if the links are quite long an animal caught will have considerable leeway of slack before another link could be caught by the prong, whereas if the links were very short the catching of the prong would become more frequent in a given length of chain.

Having thus described my invention, what I claim and desire to secure by Letters Patent, is:

1. A catch for snares comprising in combination a cylindrical body portion, a dog pivotally mounted upon the body portion and attached to the loop portion of the snare, said dog having a prong thereupon for engagement transverse the end of the body portion for holding the loop against slackening when about an object.

2. A chain snare catch comprising in combination a cylindrical body portion slidable upon the chain, a dog pivotally mounted upon the body portion and attached to the end of the noose, a prong upon the dog operable transverse the end of the body portion for locking the noose against slackening by the prong being engageable through one of the links of the chain or beside of same.

In testimony whereof I affix my signature.

JOHN KLEFFMAN.